Oct. 6, 1959     R. B. THORNESS     2,907,843
BALLOON LOAD RELEASE CONTROL MECHANISM
Filed June 29, 1956     2 Sheets-Sheet 1
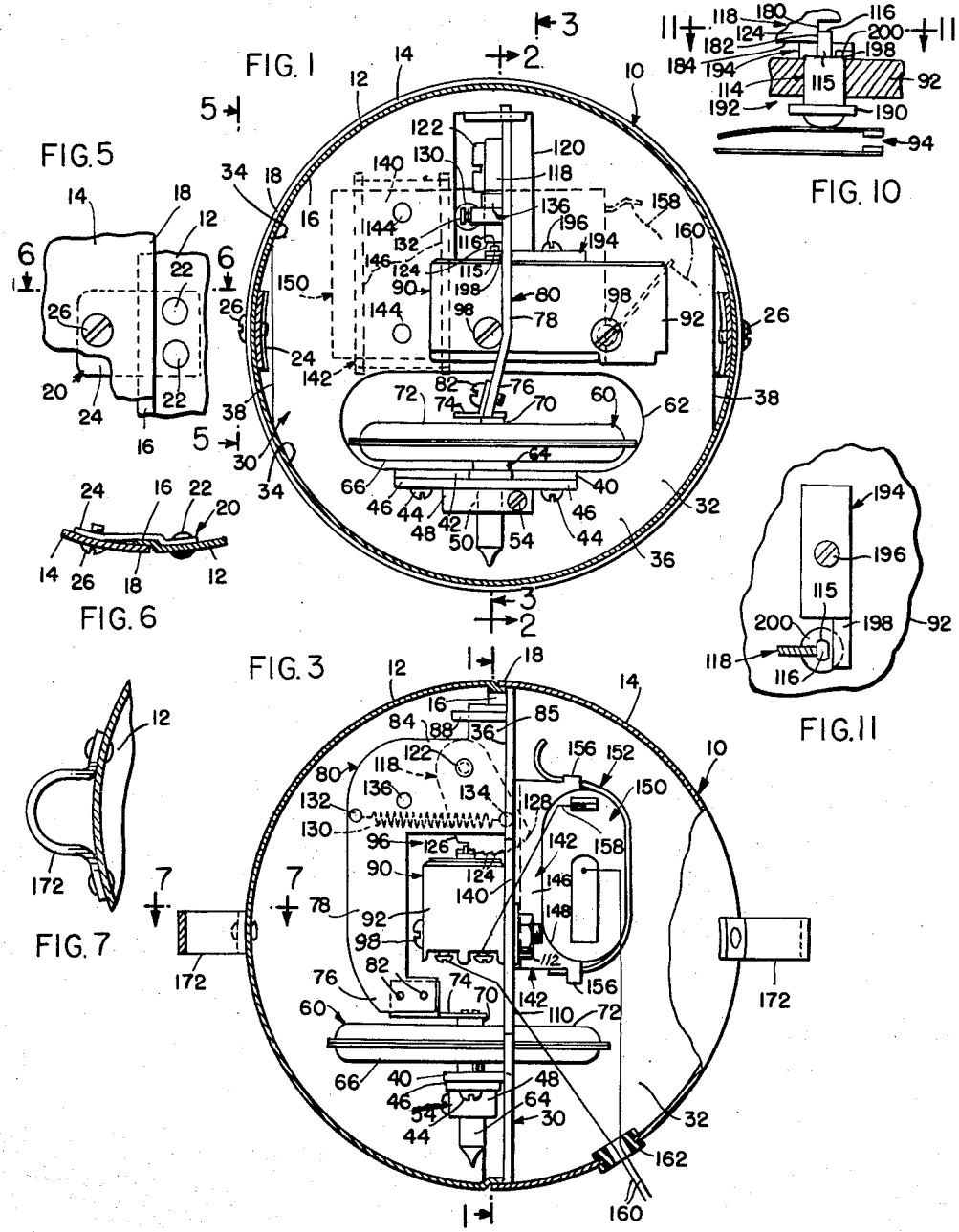
INVENTOR:
RUDOLPH B. THORNESS
BY W R Maltby
Louis Sheldon
ATT'YS Oct. 6, 1959 R. B. THORNESS 2,907,843
BALLOON LOAD RELEASE CONTROL MECHANISM
Filed June 29, 1956 2 Sheets-Sheet 2
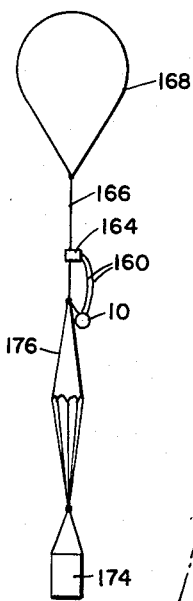
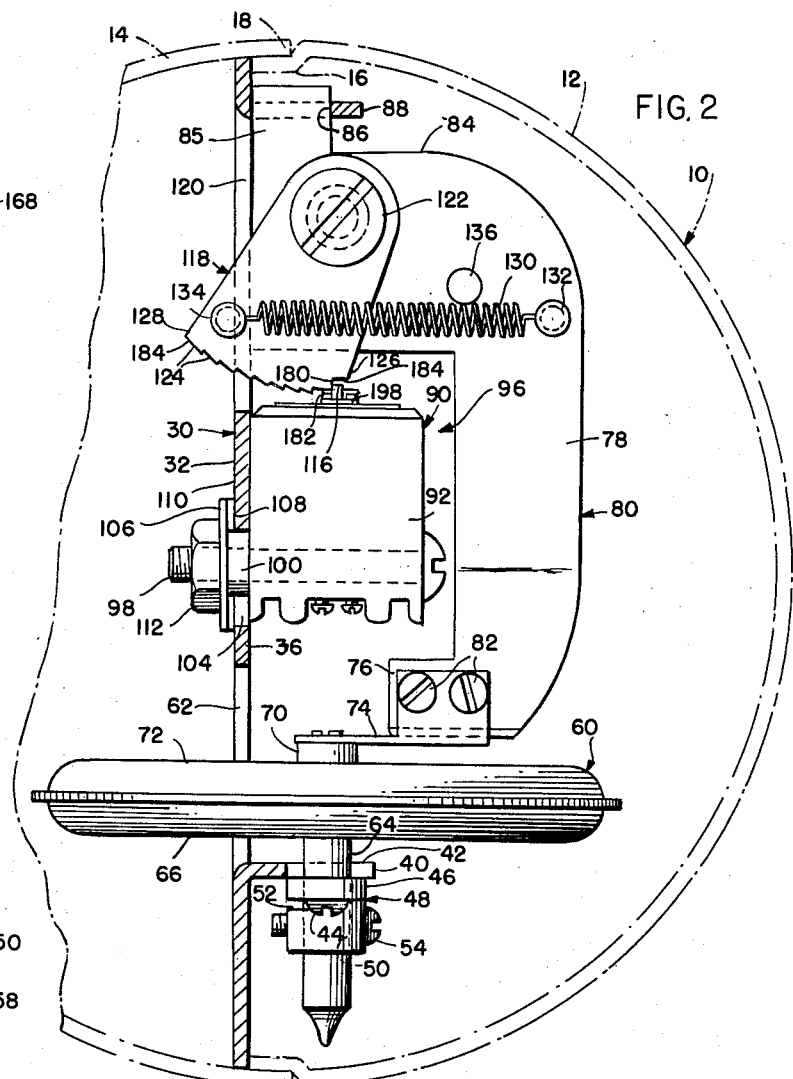
INVENTOR:
RUDOLPH B. THORNESS
BY W. R. Maltby
Louis Sheldon
ATT'YS 2,907,843
Patented Oct. 6, 1959

2,907,843
BALLOON LOAD RELEASE CONTROL MECHANISM

Rudolph B. Thorness, Minneapolis, Minn., assignor, by mesne assignments, to the United States of America as represented by the Secretary of the Navy Application June 29, 1956, Serial No. 595,036

4 Claims. (Cl. 200—83)

This invention relates to high altitude balloons and more particularly to mechanism for controlling among other things release of the load while the balloon is aloft.

It is a salient object of the invention to provide improved simple rugged pressure-sensitive mechanism for controlling a switch or other means.

An additional object is to provide against accidental destruction of a balloon load on descent of the balloon.

A further object is to provide an improved control mechanism automatically triggered while the balloon is aloft.

An additional object is to provide an improved pressure-responsive control mechanism.

Another object is to provide an improved pressure-responsive mechanism for releasing a balloon load at high altitude.

It is also an object to provide safety means for insuring release of the load at a sufficiently high altitude to enable it to be parachuted intact to earth.

Other objects and many of the attendant advantages of this invention will be readily appreciated as the same becomes better understood by reference to the following detailed description when considered in connection with the accompanying drawings wherein:

Fig. 1 is a view, partly in section and partly in elevation, taken as indicated by the line 1—1 in Fig. 3.

Fig. 2 is an enlarged view, partly in section and partly in elevation, taken as indicated by the line 2—2 in Fig. 1.

Fig. 3 is similar to Fig. 2 but on a smaller scale and looking in the opposite direction as indicated by the line 3—3 in Fig. 1.

Fig. 4 is similar to the upper part of Fig. 2 but shows the parts in a different arrangement.

Fig. 5 is a fragmentary elevational view taken as indicated at 5—5 in Fig. 1.

Fig. 6 is a sectional view taken as indicated at 6—6 in Fig. 5.

Fig. 7 is a fragmentary sectional view taken as indicated at 7—7 in Fig. 3.

Fig. 8 is a schematic diagram showing an electric circuit controlling a squib in accordance with the invention.

Fig. 9 is a more or less schematic view showing a balloon assembly including the invention.

Fig. 10 is an enlarged fragmentary view, partly in section and partly in elevation, through the microswitch plunger and case.

Fig. 11 is a plan view, partly in section, taken along the line 11—11 in Fig. 10.

Referring now more particularly to the drawings, disclosing an illustrative embodiment of the invention, there is shown at 10 a casing which may be spherical or of any other suitable shape and formed of two shells 12 and 14 adapted, after the contents to be hereinafter described are installed, to be secured in assembly, with the shell rims 16 and 18 mutually nested substantially as shown. Assembly clips 20 are riveted at 22 or otherwise suitably secured to the shell 12 and have projecting portions 24 each formed with a threaded aperture adapted to be alined with a hole in the shell 14 for the reception of a screw 26.

The apparatus adapted to be contained in the casing 10 comprises a chassis 30 in the form of a sheet metal plate or other suitable member having a main or body portion 32 which, for the purpose of accommodation to the casing, may be formed with opposite arcuate peripheral edges 34 to fit snugly into the shell 14 so that when the shell rims 16 and 18 are nested together the rim 16 abuts the outer face 36 of the chassis and cooperates with the shell 14 in holding the chassis in place. The side edges 38 of the chassis 30 are spaced from the shell 14 to provide clearance for the projecting portions 24 of the clips 20. A tang 40 projecting from the chassis portion 32 is formed with a slot 42. Screws 44 passing through the wings 46 of a socket bracket 48 and threaded into the tang 40 mount the bracket on the tang. The bracket 48 has a bore 50 leading to the tang slot 42 and is split at 52 and provided with a clamping screw 54 thereat.

An aneroid bellows 60 projecting through a hole 62 in the chassis 30 has an axial pin 64 projecting from a face 66 of the bellows and passing through the tang slot 42 and into the bracket bore 50 where it is adjustable and clamped in the desired rough adjustment by the screw 54.

Another axial pin 70, projecting from the other face 72 of the bellows 60, carries a fixed clip 74 to which an end portion 76 of a leg 78 of a preferably generally L-shaped follower 80 is anchored as by screws 82. The other follower leg 84 is in sliding engagement with the chassis face 36 and has a terminal lug 85 extending within a slot 86 formed in a second chassis tang 88, so that the follower 80 is guided and can move freely parallel to the axis of the bellows 60 with expansion and contraction of the bellows.

A microswitch unit 90, including a case 92 and a switch 94, is located in the space 96 defined by the chassis 30 and the follower 80. The case 92 is clamped against the chassis face 36 as by screws 98 passing through spacer washers 100, one (not shown) disposed in a chassis hole (not shown) and the other disposed in a chassis slot 104 (Fig. 2), a bowed spring strap 106 whose intermediate portion 108 engages the other chassis face 110, and nuts 112. The slot 104 is elongated so that the case 92 may be clamped in a selected fine adjustment. The microswitch 94 is normally sprung open and is adapted to be closed pursuant to depression to a predetermined extent of an insulation plunger 114 (Fig. 10) preferably coaxial with the bellows 60 and having an outer reduced tip 115 whose outer end is indicated at 116.

A ratchet 118 adapted to project through a chassis hole 120 is pivoted at 122 to the follower leg 84, the series of ratchet teeth 124 from one end 126 to the other end 128 being progressively farther from the pivot axis. A spring 130 anchored at 132 to the follower 80 and at 134 to the ratchet 118 constantly urges the ratchet toward a stop 136 fixed to the follower, so that, as the bellows 60 expands and accordingly the pivot 122 recedes from the plunger 114, the spring biases successive teeth 124 of increasing radius into engagement with the plunger, which thus acts like a pawl.

The bight 140 of a U-bracket 142, riveted at 144 or otherwise suitably mounted on the face 110 of the chassis 30, has arms 146 recessed at 148 to detachably nest a battery 150 retained by a detachable spring clip 152 having side notches receiving lugs 156 projecting from the arms.

An insulated wire 158 connects one battery terminal to a switch contact and insulated wires 160 lead from the other switch contact and the other battery terminal through a grommet 162 in the casing 10 to an electrically fired squib 164 about the load line 166 of a high altitude balloon 168, or to any other desired electrically operated instrumentality.

The casing 10 may be provided with outside brackets 172 by which the casing may be supported in a gondola 174 or other load carried by the balloon 168, or suspended as shown in Fig. 9, and suitable openings are provided for access of the atmosphere to the bellows 60 as well as for the passage of the wiring 160. A parachute 176 is arranged to float the load to earth when the load line 166 is severed.

The parts may be adjusted and arranged upon installation so that the face riser 180 of the tooth 124 of least radius is biased against the side 182 of the plunger tip 115 by the spring 130, as shown in Figs. 1 to 3. As the balloon 168 is launched and soars, the bellows 60 expands, moving the bellows face 72, follower 80, and ratchet 118 so as to increase the distance between the plunger 114 and the ratchet pivot 122. At a predetermined altitude in the upward flight of the balloon 168 the face 180 of the first tooth 124 will clear the plunger tip 115 and the spring 130 will snap the ratchet 118 counterclockwise (Fig. 2) to bring the face 180 of the second leading tooth against the plunger tip side 182, with the ramp or trailing wall 184 of the first tooth atop (i.e., confronting the outer end 116 of) the plunger tip. With continued rise of the balloon 168 it is apparent that the faces 180 of successive teeth 124 of progressively increasing distance from the pivot 122 will be snapped into engagement with the side 182 of the plunger 114.

If from any altitude the balloon 168 descends, the resultant contraction of the bellows 60 will force the tooth ramp 184 then facing the plunger tip end 116 to depress the plunger 114. If such descent is of an extent to effect depression of the plunger 114 sufficiently to close the microswitch 94, the squib 164 will fire and cut the load line 166, with the balloon 168 at a sufficiently great altitude to insure that the gondola 174 or other load will be parachuted safely to earth. The balloon 168 may rise enough to cause the ramp 184 of the tooth 124 of greatest radius to face the plunger tip end 116. In that event, the ratchet 118 will be at its limit of swing by reason of its engagement with the stop 136, so that the last ramp 184 will not be dislodged from its position in which it faces the plunger tip end 116. Upon sufficient descent of the balloon 168 with the ratchet 118 in the position just noted, the last ramp 184 will close the switch 94 and thereby trigger the squib 164 to cut the load line 166.

It is therefore apparent that release of the parachute 176 and gondola 174 or other load, with its instrumentation, well before completion of descent of the balloon 168, is insured with the control mechanism of the invention.

The inner end of the plunger 114 is adjacent an arm of the switch 94 and the plunger is formed with a flange 190 confronting the inner wall of the case 92 to retain the plunger in the case. In many instances in the microswitch as manufactured there is a slight clearance 192 (Fig. 10) of one extent or another between the flange 190 and the case 92 when the switch 94 is fully open. For the purpose of the present invention this clearance, or backlash, would introduce error in performance. To eliminate such error, there is provided in accordance with this invention an element 194 held to the case 92 by a screw 196 and having an extension 198 engaging the outer face 200 of the plunger 114 at the base of the tip 115, the screw being adjusted to a position such as to insure engagement of the plunger with the adjacent contact arm of the switch 94. Thus whenever the plunger 114 is depressed by the ratchet 118, there can be no lost motion, such depression being immediately effective to move the adjacent switch contact toward the other contact of the switch 94.

The device could be used in connection with an aircraft, and could be made to close the switch pursuant to descent instead of pursuant to ascent as above described.

Obviously many modifications and variations of the present invention are possible in the light of the above teachings. It is therefore to be understood that within the scope of the appended claims the invention may be practiced otherwise than as specifically described.

I claim:

1. In a high altitude balloon assembly, a support, an aneroid diaphragm bellows mounted on the support so that an end of the bellows moves axially thereof with bellows expansion and contraction, a switch carried by the support and having a plunger spring-pressed in a direction parallel to the bellows axis, a bracket mounted to move with said end, a ratchet pivoted to the bracket about an axis normal to the bellows axis, the ratchet teeth extending in a row of progressively increasing radius from the pivot axis, said row intersecting the plunger path, means biasing the teeth broachwise relative to the plunger and holding the leading tooth riser against a side of the plunger, the ratchet having a wall extending from the foot of said riser in the direction of bias and in a position to depress the plunger pursuant to contraction of the bellows while said riser engages the side of the plunger, the trailing wall of each tooth bearing the same relation to the riser of the next trailing tooth that the first-mentioned wall bears to the leading tooth riser, so that, upon successive predetermined increments of bellows expansion, the biasing means will snap successive trailing risers against the side of the plunger, and, upon a predetermined increment of bellows conraction while a wall engages the plunger, that wall will depress the plunger sufficiently to actuate the switch.

2. In a high altitude balloon assembly, a support, an aneroid bellows carried by the support, a switch carried by the support and having a spring-pressed contact pawl, a bracket mounted to reciprocate with expansion and contraction of the bellows, a ratchet member pivoted to the bracket and having teeth in a row about the pivot axis and cooperating with the pawl, means biasing the member to turn in one direction and holding the riser of the leading tooth of the row against the pawl, the member having an additional wall extending in said direction from the foot of the leading tooth riser in a position to depress the pawl pursuant to contraction of the bellows while the member is so detained by the pawl, the teeth being arranged broachwise relative to the pawl, the trailing wall of each tooth bearing the same relation to the riser of the next trailing tooth that said additional wall bears to the leading tooth riser, so that the biasing means will snap the riser of the next tooth against the pawl as the bellows undergoes a predetermined increment of expansion, and, upon a predetermined increment of contraction of the bellows while a wall engages the pawl, that wall will depress the pawl sufficiently to actuate the switch.

3. In a high altitude balloon assembly, a switch including a spring-pressed contact pawl, a member having a row of ratchet teeth and cooperating with the pawl, means constantly biasing the member in one direction, with the risers of the teeth facing in said direction, the member having a wall extending in said direction from the foot of the leading tooth riser, means for reciprocating the member transverse to said direction, the biasing means holding the leading tooth riser against the pawl, with said wall in a position to depress the pawl pursuant to movement of the member in one direction of reciprocation, the row of teeth being arranged broachwise relative to the pawl, the trailing wall of each tooth bearing the same relation to the riser of the next trailing tooth that the first-mentioned wall bears to the leading tooth riser, so that, with a predetermined increment of movement of the member in the opposite direction of reciprocation, the biasing means will snap the riser of the next trailing tooth against the pawl in the position theretofore occupied by the leading tooth riser, with the trailing wall of the leading tooth in the potential element-depressing position, and, with a predetermined increment of movement of the member in said one direction of reciprocation while a wall engages the pawl, that wall will depress the pawl sufficiently to actuate the switch.

4. The structure of claim 3, together with means for preventing further movement of the ratchet member in response to the biasing means when the trailing wall of the last tooth of the row is in the potential plunger-depressing position.

References Cited in the file of this patent

UNITED STATES PATENTS

| | | |
|---|---|---|
| 1,023,759 | Rectenwald | Apr. 16, 1912 |
| 1,495,998 | Gilchrist et al. | June 3, 1924 |
| 1,499,370 | James | July 1, 1924 |
| 2,337,361 | Vienneau | Dec. 21, 1943 |
| 2,442,138 | Zeller et al. | May 25, 1948 |
| 2,478,138 | Tobias | Aug. 2, 1949 |
| 2,697,147 | Harland | Dec. 14, 1954 |
| 2,756,948 | Winzen et al. | July 31, 1956 |

FOREIGN PATENTS

| | | |
|---|---|---|
| 18,980 of 1912 | Great Britain | May 22, 1913 |
| 652,540 | Germany | Nov. 4, 1937 |